(12) United States Patent
Houben et al.

(10) Patent No.: US 6,586,698 B2
(45) Date of Patent: Jul. 1, 2003

(54) METHOD OF OPERATING A WELDING MACHINE AND A WELDING MACHINE

(75) Inventors: Johannes Peter Lodevicus Houben, Eindhoven (NL); Marinus Adrianus Maria Van De Veerdonk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/848,888

(22) Filed: May 4, 2001

(65) Prior Publication Data

US 2001/0040148 A1 Nov. 15, 2001

(30) Foreign Application Priority Data

May 11, 2000 (EP) ............................................. 00201682

(51) Int. Cl.[7] .............................................. B23K 11/16
(52) U.S. Cl. .................................. 219/56.22; 219/86.8
(58) Field of Search .............................. 219/56.1, 56.21, 219/56.22, 86.7, 86.8

(56) References Cited

U.S. PATENT DOCUMENTS

| 1,935,343 | A | * | 11/1933 | Achard ..................... 200/86 R |
|---|---|---|---|---|
| 3,351,732 | A | * | 11/1967 | Adams ........................ 219/108 |
| 3,575,570 | A | * | 4/1971 | Gellatly et al. ............. 219/56.1 |
| 4,789,095 | A | * | 12/1988 | Kobayashi ................ 219/56.21 |
| 4,873,410 | A | * | 10/1989 | Aidlin et al. .............. 219/56.1 |
| 5,386,092 | A | | 1/1995 | Dufrenne .................. 219/86.32 |
| 5,484,975 | A | * | 1/1996 | Itatsu ......................... 219/86.7 |

FOREIGN PATENT DOCUMENTS

DE        4137574 A1    5/1993    ........... B23K/11/10

* cited by examiner

*Primary Examiner*—M. Alexandra Elve
*Assistant Examiner*—Len Tran

(57) ABSTRACT

A method of operating a welding machine as well as to a welding machine comprising a frame, a first electrode (33) having a fixed position in the frame and a second electrode (35) which is mounted in the frame so as to be movable with respect to the frame, whereby said second electrode (35) can be moved towards the first electrode (33) for welding together components arranged between said two electrodes (33, 35). During displacement of the second electrode (35) from a starting position towards a welding position, the second electrode (35) is moved more rapidly at the beginning of the displacement than at the point where the second electrode is near the position suitable for welding. To obtain said displacement of the second electrode (35), a cam mechanism (10) has been provided between an operating member (12) and a lever (28), which cam mechanism supports the second electrode (35) and is pivotable with respect to the frame.

18 Claims, 4 Drawing Sheets

METHOD OF OPERATING A WELDING MACHINE AND A WELDING MACHINE

Figure 1:
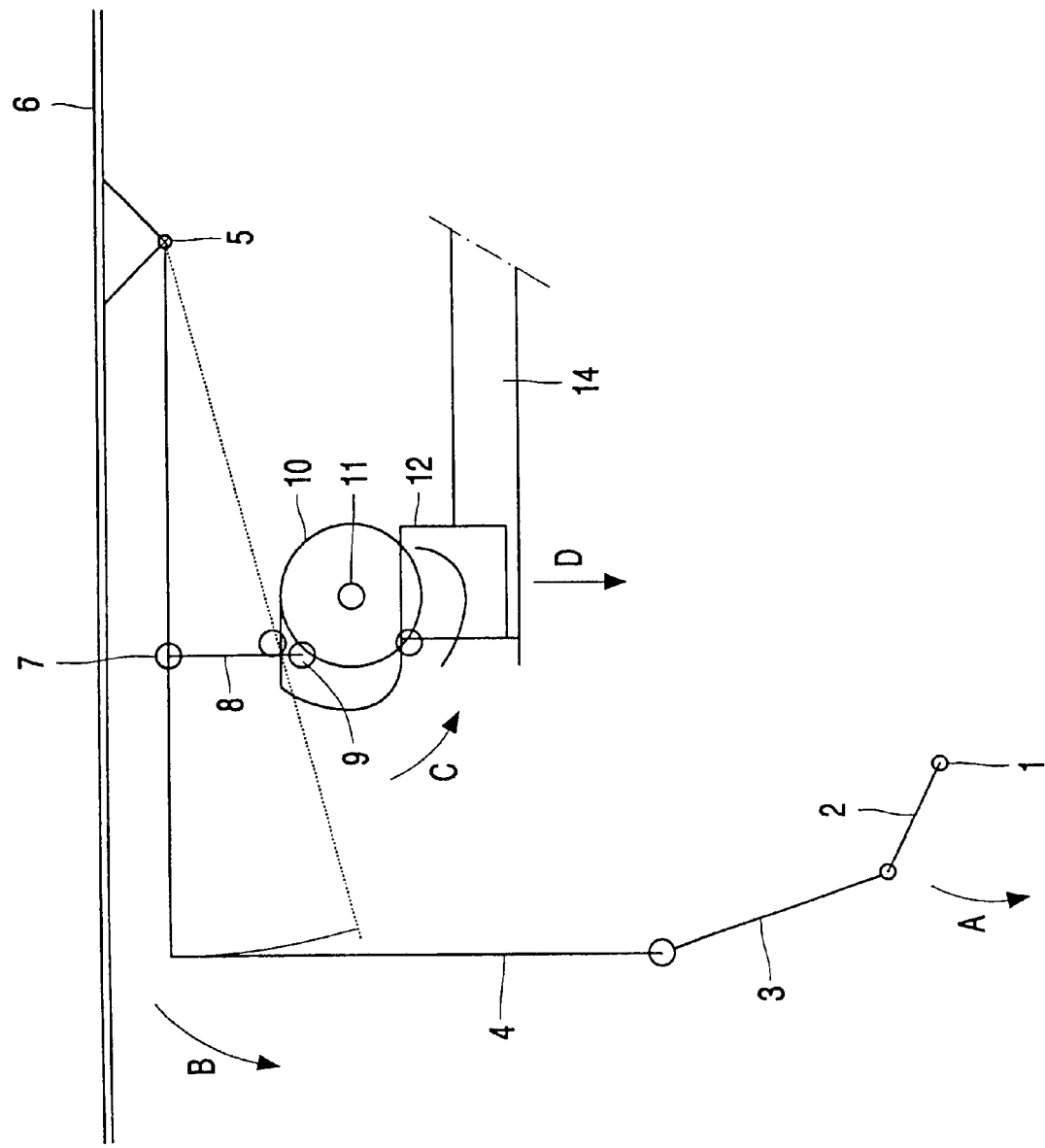

The invention relates to a method of operating a welding machine comprising a frame, an electrode having a fixed position in the frame and an electrode which has been mounted in the frame so as to be movable with respect to said frame, which latter electrode is moved towards the fixed electrode to weld together components placed between the fixed and the movable electrode.

Such welding machines can be used, for example, in the manufacture of display tubes, more particularly in the manufacture of electron guns.

As regards the operation of the known welding machines, the movable electrode is customarily moved at a substantially constant rate from a starting position to the position suitable for welding; particularly if the devices are operated by man power, the rate of movement still is highly dependent on the operator. In this case, the components of the electron guns which are to be welded together, and which are placed on the fixed electrode, are contacted by the movable electrode at a comparatively high rate, causing undesirable vibrations in the electrodes and/or components when the movable electrode contacts said components, which may adversely affect the welds themselves and/or lead to the formation of undesirable welding spatters. However, electron guns having welding spatters and/or electron guns comprising components which are improperly welded together are unsuitable for use.

It is an object of the invention to maximally preclude the drawbacks occurring in the known method of welding together components.

In accordance with the invention, this object can be achieved in that during displacing the movable electrode from a starting position to a suitable position for welding, the movable electrode is moved more rapidly at the beginning of the displacement than at a location near the suitable welding position of the movable electrode.

By using the method in accordance with the invention, the movable electrode will contact the components to be welded together at a low rate, so that these components will be uniformly clamped between the movable electrode and the fixed electrode, and undesirable vibrations are precluded.

A further aspect of the invention relates to a welding machine comprising a frame, an electrode having a fixed position in the frame and an electrode which has been mounted in the frame so as to be movable with respect to said frame, which latter electrode can be moved by means of a man-power operated operating member in the direction of the fixed electrode by means of a transmission mechanism arranged between the operating member and the movable electrode.

In known welding machines of the above-mentioned type, the operating member is coupled to the movable electrode via a system of rods. As a result, the rate at which the electrode is displaced depends to a substantial degree on the person operating the welding machine, so that a constant operation of the machine cannot be ensured. A further drawback of the known welding machine resides in that the movable electrode contacts the welding components to be clamped between the fixed and the movable electrode at a comparatively high rate when it is moved towards the fixed electrode, which leads to undesirable vibrations at the location where said components are clamped, which adversely affects the welds and/or leads to the formation of welding spatters.

In accordance with the invention, the transmission mechanism is provided with a cam, which can be pivoted around a pivot pin from a starting position through a certain angle by means of the operating member to displace the movable electrode in the direction of the fixed electrode, which cam co-operates, during operation, with an adjusting member connected to the movable electrode, and the construction of the cam and the adjusting member co-operating with said cam being such that at the beginning of the pivotal motion of the cam for displacing the movable electrode in the direction of the fixed electrode, the adjusting member is displaced at a higher rate than during the pivotal motion of the cam through the last part of the angle through which the cam is pivotable around the pivot pin for displacing the movable electrode in the direction of the fixed electrode.

By means of the construction in accordance with the invention, it can be readily achieved that when the operating member is initially put into operation, the movable electrode is rapidly moved in the direction of the fixed electrode, while, in the last stage of the movement of the movable electrode, the rate of the movable electrode is reduced, so that the movable electrode reaches its final position, i.e. the position wherein the components to be welded together are clamped between the fixed and the movable electrode, at a low rate. As a result, undesirable vibrations which adversely affect welding are precluded.

These and other aspects of the invention will be apparent from and elucidated with reference to the embodiment(s) described hereinafter.

In the drawings:

FIG. 1 diagrammatically shows the structure of the operating member and the transmission mechanism provided between the operating member and the movable electrode.

Figure 2:
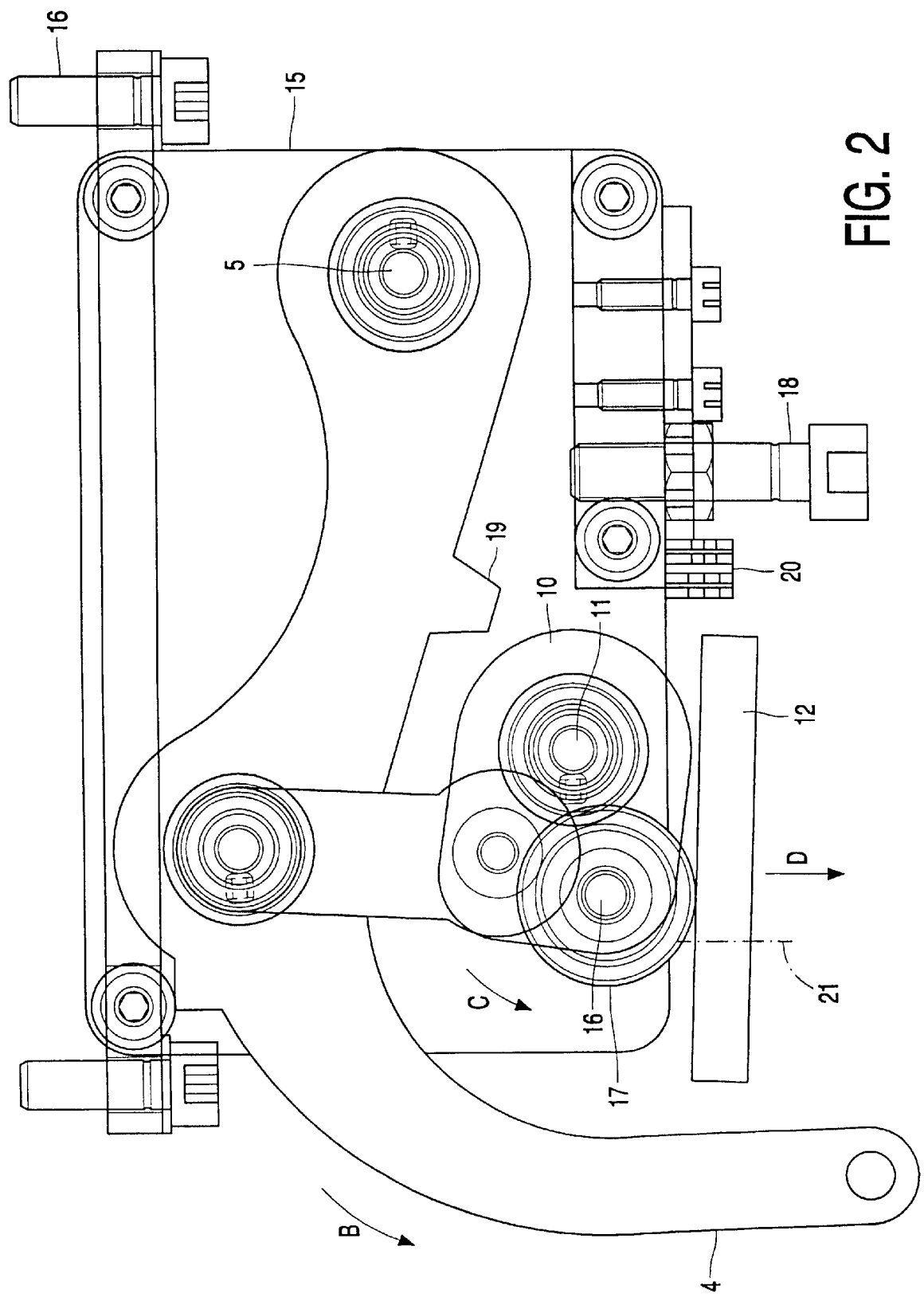

FIG. 2 diagrammatically shows a part of a welding machine in accordance with the invention.

Figure 3:
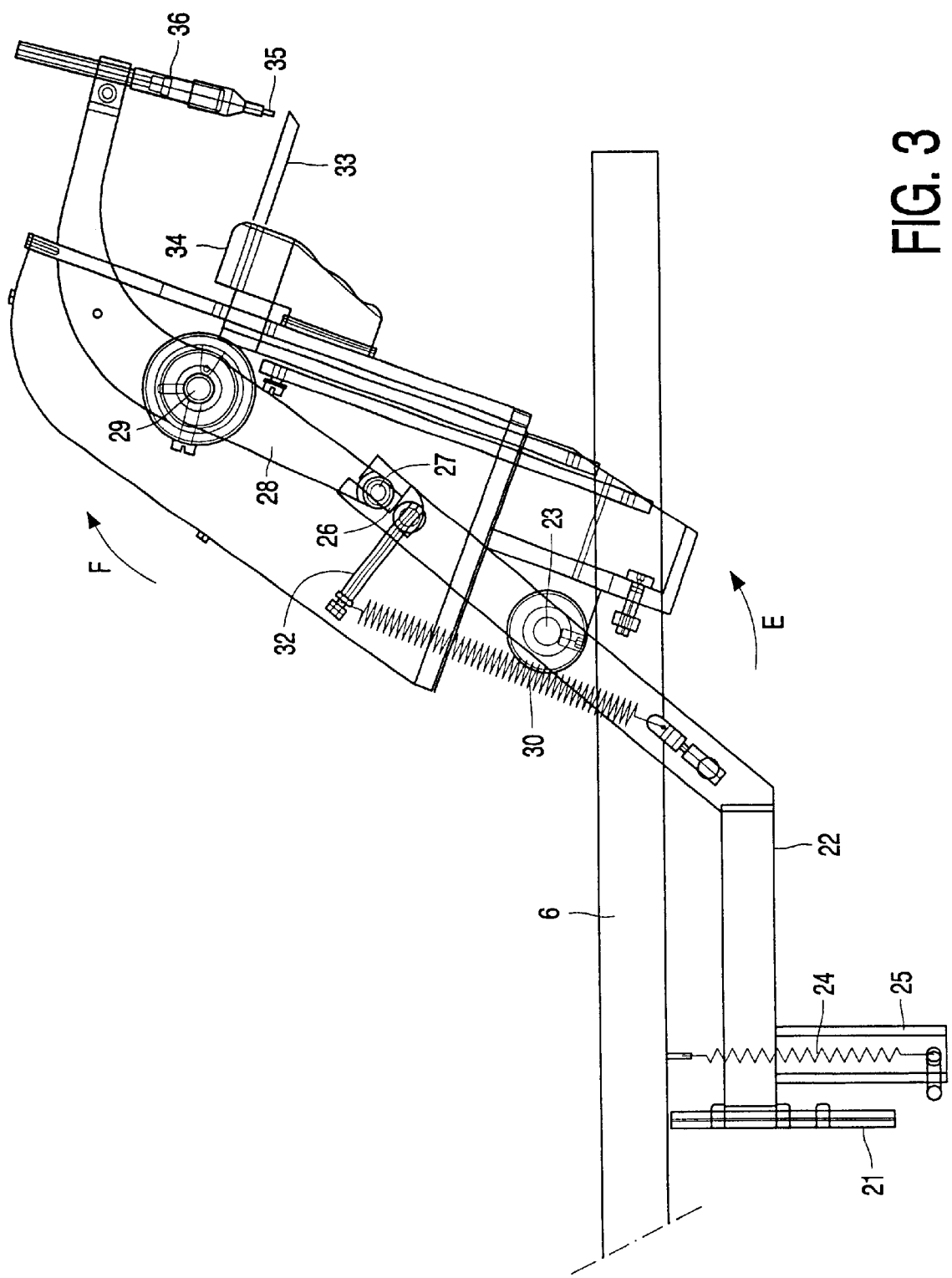

FIG. 3 shows, on a reduced scale, a second part of the welding machine in accordance with the invention.

Figure 4:
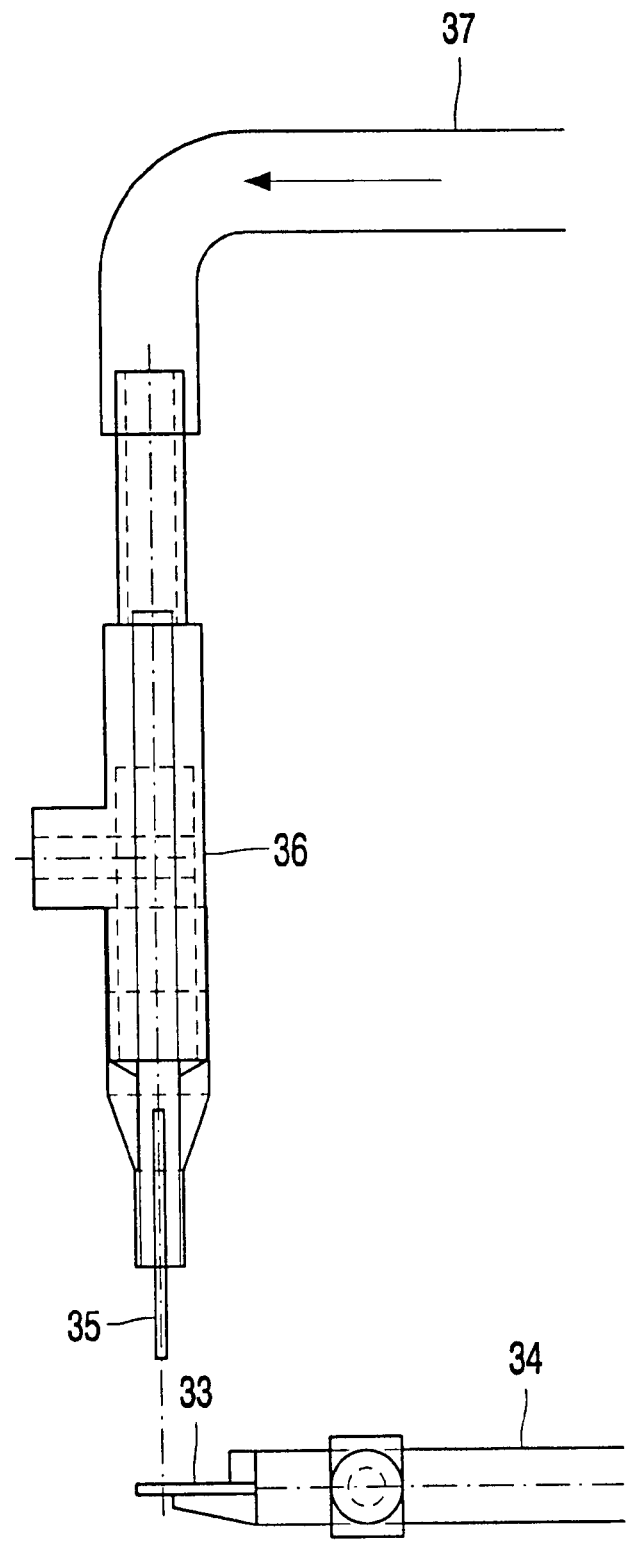

FIG. 4 diagrammatically shows the arrangement of the fixed and the movable electrode.

As diagrammatically shown in FIG. 1, a foot pedal 2 forming an operating member is capable of pivoting about a pivot pin 1, which is rigidly arranged in a frame of a welding machine, which is not shown in detail, which foot pedal is pivoted to a coupling rod 3 at the end facing away from the pivot pin 1. The end of the coupling rod 3 facing away from the foot pedal 2 is pivoted to an end of a lever 4, which is coupled, at its other end, to a table top 6 by means of a hinge pin 5, which table top forms part of a frame of the welding machine which is not shown in greater detail.

Between the ends of the lever 4, a coupling rod 8 is coupled to said lever 4 by means of a horizontal hinge pin 7 which extends parallel to the hinge pin 5. The other end of the coupling rod 8 is coupled to a cam 10 by means of a hinge pin 9 which extends parallel to the hinge pin 7, said cam being pivotable about a pivot pin 11, which is in a fixed position in the frame and extends parallel to the hinge pin 9.

The cam 10 co-operates with an adjusting member 12, which is secured to a carrier 14 with which a movable electrode is connected in a manner which will be described in more detail hereinbelow.

It will be clear that, if the person operating the welding machine steps on the operating member formed by the foot pedal 2, the foot pedal 2 will swing in the direction indicated by means of arrow A, which causes a rotation of the lever 4 about the pin 5 in the direction indicated by means of arrow B, causing the cam 10 coupled to the lever 4 to be rotated about the pin 11 in the direction indicated by means of arrow C. The cam 10 rotating about the pin 11 will then cause the adjusting member 12 co-operating with the cam 10 to move in the direction indicated by means of arrow D.

The shape of the cam 10, which is a variable geometry mechanism shown in the drawing, causes the adjusting member 12 to be initially moved at a certain rate in the direction indicated by means of arrow D, which rate decreases and approaches zero if the curved portion of the cam 10, in FIG. 1 on the left of the pivot pin 11 of the cam 10, contacts the upper surface of the adjusting member 12.

A further, more detailed representation of a welding machine, which is provided with a transmission mechanism as described hereinabove with reference to FIG. 1, is shown in FIGS. 2 and 3. Components shown in FIGS. 2 and 3 which correspond to the above described components, as shown in FIG. 1, bear the same reference numerals as in FIG. 1.

In FIG. 2, the lever 4 is shown, which is coupled to a support 15 by means of the hinge pin 5, which support 15 can be secured to the table top 6, not shown in FIG. 2, by means of bolts 16.

The cam 10 is also coupled to the support 15 by means of the hinge pin 11.

A roll 17 is coupled to the cam 10, so as to be freely rotatable, by means of a pin 16 extending parallel to the hinge pin 11. The roll 17 rests on the upper side of the adjusting member 12.

Also an adjusting bolt 18 is connected to the support 15, which adjusting bolt co-operates with the lever 4 to limit its rotation in the direction indicated by arrow B by means of the foot pedal 2.

A projecting cam 19 provided on the lever 4 co-operates with a sensor 20 in such a manner that when the final position of the lever 4 is reached when it is swung in the direction indicated by means of arrow B, the cam 19 activates the sensor 20 to give off a signal to start the intended welding operation.

The adjusting member 12 is secured to a lever 22 by means of a bolt 21, see FIG. 3, of which only the centerline is shown in FIG. 2, which lever 22 can be swung with respect to the table top 6 about a hinge pin 23 which is in a fixed position in the frame of the welding machine and which extends in a horizontal direction, parallel to the hinge pin 5. A tension spring 24, which is arranged between the lower side of the table top 6 and an end of an arm 25 secured to the lever 22, tries to keep the lever 22, and via the adjusting member 12 also the lever 4 and the cam 10 connected thereto, in the starting position of the lever 4, as shown in FIG. 2, or to move it to said starting position.

As shown in FIG. 3, a slotted hole 26 is formed in the end portion of the lever 22 situated above the hinge pin 23. This slotted hole 26 accommodates a pin 27 which is secured to the end of a lever 28, which is mounted in the frame of the welding machine so as to be swingable, by means of a hinge pin 29 which is in a fixed position in the frame of the welding machine and extends parallel to the hinge pin 23.

A resilient mechanism, not shown in greater detail, presses the pin 27 against the left bounding surface of the slotted hole 26, as shown in FIG. 3.

At a point situated below the hinge pin 23, the end portion of a tension spring 30 is coupled to the lever 22. The other end portion of the tension spring 30 is coupled, at a point situated above the hinge pin 23, to the end portion of a rod 32, which extends substantially perpendicularly to a plane through the two hinge pins 29 and 23. The length of the rod 32 can be adjusted, so that also the point at which the tension spring 30 acts on the end of the rod 32 can be adjusted with respect to the other components of the welding machine.

The fixed electrode is formed by an exchangeably provided plate 33, which is preferably made from tungsten with 2% lanthanum oxide, and which is clamped to a support 34 (FIG. 4), which is preferably made of copper, and which is secured to the frame of the welding machine.

The movable electrode consists of a pin 35, which is preferably made of copper, and which is exchangeably accommodated in a housing 36, which is provided at the end of the lever 28, as shown in FIG. 3, whereby the free end portion of the pin-shaped electrode 35 is situated opposite the fixed electrode 33.

An inert gas can be supplied via a line 37 connected to the housing 36, which inert gas will flow from the housing 36, during the welding operation, so as to surround the electrode 35 and protect the welding spot.

It has been found that the above-described embodiment of the electrodes contributes to a long service life of the electrodes, while also permitting the use of electrodes which are cheap to manufacture and, if necessary, readily exchangeable.

As has been explained hereinabove, to carry out the welding operation, the lever 4 will be rotated by means of the foot pedal 2 in the direction indicated by means of arrow B, as a result of which the roll 17 connected to the cam 10 will roll down the upper surface of the adjusting member 12, causing this adjusting member 12 to be moved downwards in the direction indicated by means of arrow D.

As a result of this displacement of the adjusting member 12, the lever 22, to which the adjusting member 12 is secured by means of the bolt 21, will be swung about the pin 23 in the direction indicated by means of arrow E. This leads to a swinging movement of the lever 28 about the pivot pin 29 in the direction indicated by means of arrow F, as a result of which the electrode 35 will be displaced in the direction of components to be welded together, which are placed on the electrode 33.

When the cam 10 is swung about the pin 11, the roll 17 connected to the cam 10 and co-operating with the adjusting member 12, more particularly the point of contact between the roll 17 and the adjusting member 12, will move from a starting position, indicated in FIG. 2, wherein this point of contact, viewed in the direction of the centerline of the pin 11, is situated at some distance from this centerline, to a position where this point of contact is situated close to the vertical plane through said centerline.

As a result, at the start of the swinging motion of the lever 4 from the starting position shown in FIG. 2, a comparatively rapid displacement of the adjusting member 12 and hence a comparatively rapid swinging movement of the levers 22 and 28 will take place, as has been explained hereinabove, so that the movable electrode 35 is moved at a comparatively high rate in the direction of the fixed electrode 33, while during the last part of the movement of the movable electrode 35 in the direction of the fixed electrode 33, a slower displacement of the adjusting member 12 and hence a slower swinging motion of the levers 22 and 28 and thus a slower displacement of the movable electrode 35 in the direction of the fixed electrode 33 will take place.

By providing the springs 34 and 30, it is precluded that, during the stage of movement where the speed of movement of the adjusting member 12 decreases in the direction indicated by means of arrow D, the levers 22 and 28 continue to swing comparatively rapidly as a result of their mass inertia, which could lead to too high a welding pressure.

When the operating pedal 2 is released after the weld has been formed, the tension spring 24, as already indicated hereinabove, will make the different components return to the starting position shown in FIGS. 2 and 3.

What is claimed is:

1. A method of operating a welding machine comprising:

a frame;

a fixed electrode having a fixed position in the frame; and a moveable electrode which has been mounted in the frame so as to be movable with respect to said frame, which movable electrode is moved towards the fixed electrode to weld together components placed between the fixed and the movable electrode, wherein during displacing the movable electrode from a starting position to a suitable position for welding, the movable electrode is moved by a variable geometry mechanism, which includes a cam, more rapidly at the beginning of the displacement than at a location near the suitable welding position of the movable electrode.

2. A welding machine comprising:

a frame;

a fixed electrode having a fixed position in the frame; and a movable electrode which has been mounted in the frame so as to be movable with respect to said frame, which movable electrode can be moved by a man-power operated operating member in the direction of the fixed electrode by transmission mechanism (3–12) arranged between the operating member and the movable electrode, wherein the transmission mechanism is provided with a cam which can be pivoted around a pivot pin from a starting position through a certain angle by the operating member to displace the movable electrode in the direction of the fixed electrode, which cam co-operates, during operation, with an adjusting member connected to the movable electrode, and the cam and the adjusting member co-operating with said cam being embodied such that at the beginning of the pivotal motion of the cam for displacing the movable electrode in the direction of the fixed electrode, the adjusting member is displaced at a higher rate than during the pivotal motion of the cam through the last part of the angle through which the cam is pivotable around the pivot pin for displacing the movable electrode in the direction of the fixed electrode.

3. The welding machine of claim 2, wherein the cam and the adjusting member co-operating with said cam are embodied such that, viewed in the direction of the pivot pin of the cam, the point where there is acted on the adjusting member by means of the cam, moves in the direction of a vertical plane during the displacement of the movable electrode in the direction of the fixed electrode, which vertical plane extends through the horizontally arranged pivot pin of the cam.

4. The welding machine of claim 2 wherein:

a roll is coupled to the cam;

the roll can be freely rotated around a pin extending parallel to the pivot pin of the cam; and the roll rests on an upper surface of the adjusting member.

5. The welding machine of claim 2, wherein:

the cam is coupled to a lever by means of a coupling rod; and the lever is swingable with respect to the frame by means of the operating member.

6. The welding machine of claim 5, wherein adjustable means are provided to limit the stroke of the lever during the displacement of the movable electrode in the direction of the fixed electrode.

7. The welding machine of claim 2, including resilient means for making the cam go towards the starting position.

8. The welding machine of claim 7, including means for adjusting the spring tension of the resilient means.

9. The welding machine of any one of the claims 2 to 8, wherein:

the movable electrode is made of copper; and the fixed electrode is made of tungsten with 2% lanthanum oxide.

10. The welding machine of claim 9, wherein the movable electrode and the fixed electrode are provided so as to be exchangeable.

11. The welding machine of claim 3, wherein:

a roll is coupled to the cam;

the roll can be freely rotated around a pin extending parallel to the pivot pin of the cam; and the roll rests on an upper surface of the adjusting member.

12. The welding machine of claim 3, wherein:

the cam is coupled to a lever by means of a coupling rod; and the lever is swingable with respect to the frame by means of the operating member.

13. The welding machine of claim 4, wherein:

the cam is coupled to a lever by means of a coupling rod; and the lever is swingable with respect to the frame by means of the operating member.

14. The welding machine of claim 3, including resilient means for making the cam go towards the starting position.

15. The welding machine of claim 4, including resilient means for making the cam go towards the starting position.

16. The welding machine of claim 5, including resilient means for making the cam go towards the starting position.

17. The welding machine of claim 6, including resilient means for making the cam go towards the starting position.

18. The welding machine of any one of the claims 2 to 8, wherein the movable electrode and the fixed electrode are provided so as to be exchangeable.

* * * * *